US008762502B2

(12) United States Patent
Goetz

(10) Patent No.: US 8,762,502 B2
(45) Date of Patent: Jun. 24, 2014

(54) INSTALLATION OF SERVER-STORED DISK IMAGE ON CLIENT

(75) Inventor: Holger Goetz, Esslingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 13/281,038

(22) Filed: Oct. 25, 2011

(65) Prior Publication Data

US 2013/0103812 A1   Apr. 25, 2013

(51) Int. Cl.
  *G06F 15/16* (2006.01)
(52) U.S. Cl.
  USPC ............................ 709/220; 709/221; 709/222
(58) Field of Classification Search
  None
  See application file for complete search history.

(56) References Cited

U.S. PATENT DOCUMENTS

| 6,421,777 | B1 | 7/2002 | Pierre-Louis et al. |
| 6,751,658 | B1 | 6/2004 | Haun et al. |
| 6,859,925 | B2 * | 2/2005 | Lin ................................ 717/178 |
| 2003/0163809 | A1 * | 8/2003 | Bantz et al. .................... 717/177 |
| 2005/0160150 | A1 * | 7/2005 | Kao ............................... 709/212 |
| 2008/0028035 | A1 | 1/2008 | Currid et al. |
| 2010/0037207 | A1 * | 2/2010 | Chambers et al. ............. 717/121 |
| 2010/0192145 | A1 * | 7/2010 | Liles et al. ..................... 717/174 |
| 2010/0306760 | A1 | 12/2010 | Mulligan et al. |
| 2011/0138449 | A1 * | 6/2011 | Jirka et al. ......................... 726/7 |
| 2013/0007739 | A1 * | 1/2013 | Poddar et al. ..................... 718/1 |
| 2013/0097464 | A1 * | 4/2013 | Ahmad et al. ................ 714/47.1 |

OTHER PUBLICATIONS

C. Mceniry, "Moobi: A thin server management system using BitTorrent," Procs. of 21st Large Installation System Admin. Conf., Nov. 11-16, 2007.

* cited by examiner

*Primary Examiner* — Djenane Bayard

(57) ABSTRACT

A client computing device uses a transport protocol to randomly access over a network a disk image stored on a server computing device. The disk image is remotely mounted at the client computing device from the server computing device. The disk image is installed on a storage device of the client computing device, without having to map the disk image as a network drive at the client computing device and/or without downloading the disk image locally to the client computing device.

18 Claims, 2 Drawing Sheets

INSTALLATION OF SERVER-STORED DISK IMAGE ON CLIENT

BACKGROUND

Computing devices, such as desktop and laptop computers, typically have storage devices like hard disk drives on which computer programs are installed for execution on the computing devices. These computer programs generally include an operating system, and a number of application programs that run in conjunction with the operating system. The collection of computer programs that are installed on the storage device of a computing device can be referred to as a disk image.

DETAILED DESCRIPTION

Figure 1:
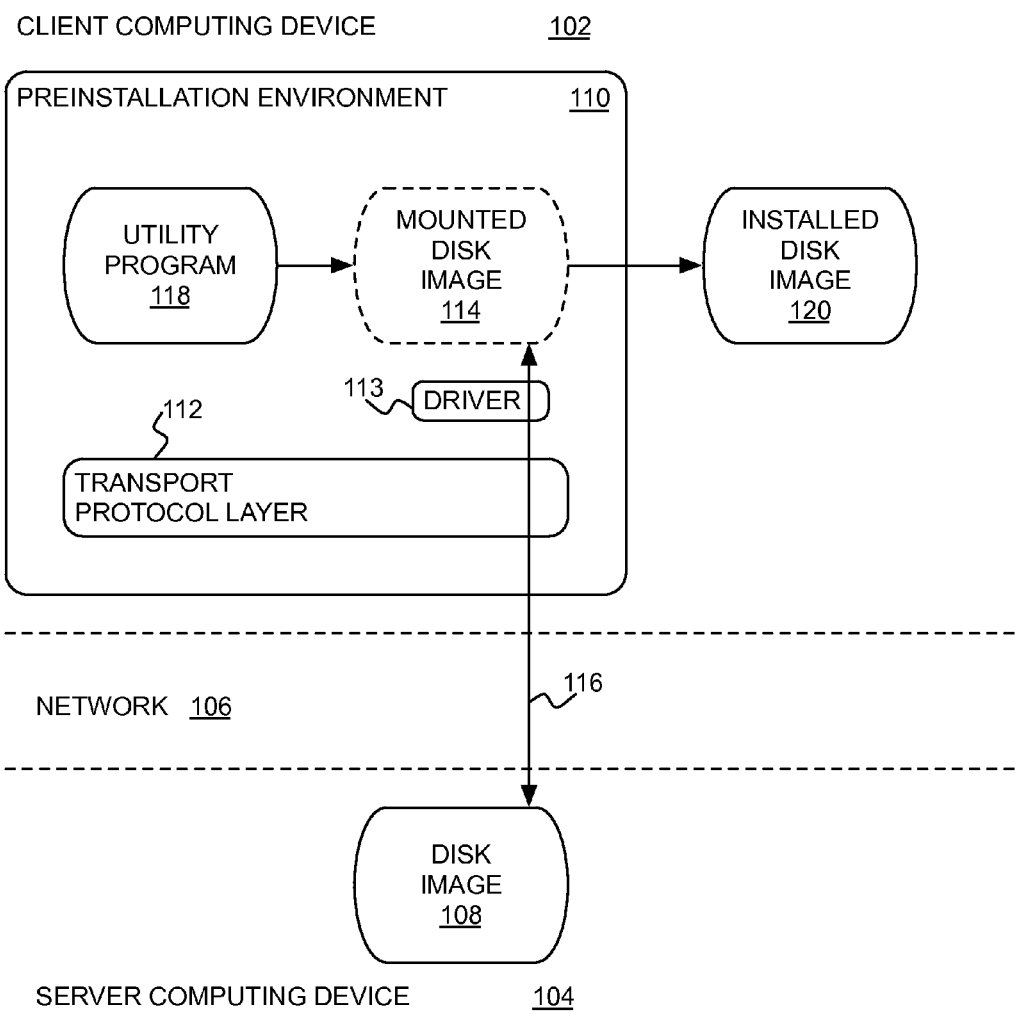
FIG. 1 is a diagram of an example system in which a server-stored disk image is installed on a client.

As noted in the background section, a disk image refers to a collection of computer programs that are installed on a storage device of a computing device. A disk image may be prepared in advance, and installed on the storage device of a new or existing computing device. This typically occurs in enterprise and other environments in which the computer programs that are to be installed on a computing device are known in advance, and a suitable disk image prepared in advance to speed the deployment process.

A disk image that can be installed onto the storage device of a computing device and that includes a version of the Microsoft Windows® operating system, available from Microsoft Corp., of Redmond, Wash., may be stored prior to installation in a file-based disk image format like the Microsoft Windows Imaging Format (WIM). To install such a disk image on the storage device of a computing device, usually one of two different utility programs is employed: a setup computer program, or the ImageX command line tool available from Microsoft Corp. In both scenarios, the storage device of the intended computing device typically has a preinstallation environment, such as the Microsoft Windows Preinstallation Environment (Windows PE) available from Microsoft Corp.

It is noted that the storage device in this respect can include a non-volatile storage device, such as a hard disk drive or a solid state drive (SSD), and/or a volatile storage device, such as dynamic random-access memory. In the latter case, the preinstallation environment may be accessible over a network, and retrieved from over the network for temporary storage within the volatile random-access memory. The disk image itself is then installed on the non-volatile hard disk drive or the SSD.

A preinstallation environment is a compact and minimal operating system that is intended to permit a full operating system to be installed. That is, a preinstallation environment permits a minimal amount of functionality to be performed on the computing device, so that a full-featured operating system can be installed on the computing device. As such, a utility program like a setup computer program or the ImageX command line tool is executed within a preinstallation environment to install a disk image on the storage device of the computing device. In general operation, a disk image specified in a file-based disk image format is first copied to the computing device's storage device, and then the utility program is executed to decompress and install this disk image.

A problem occurs when the storage device of the computing device has a minimal amount of storage space. For instance, thin client computing devices may have storage devices with small amounts of storage space, for cost and other reasons. The storage space is typically specified to be sufficient to store the installed version of a disk image. However, existing utility programs generally need to have sufficient room on the storage device to first copy the disk image in a file-based disk image format before installing the disk image. Therefore, such tools cannot be used to install disk images on client computing devices having storage devices with insufficient capacities, even if the storage devices otherwise have sufficient capacities to ultimately store the installed version of the disk image in question.

This problem is compounded by the fact that many such utility programs randomly access the disk image to install the disk image onto the storage device of a computing device. As such, the disk image cannot simply be sequentially streamed from a remote storage device—i.e., from a storage device of a remote server computing device—in lieu of first making a local copy of the disk image. While these utility programs may not be employed to install the disk image, their utilization is desirable due to the flexibility and configuration the programs afford. Furthermore, simply specifying storage devices with larger capacities is wasteful and can be costly, particularly when the larger capacities are used just for the initial installation of the disk image.

A limited solution is to map a remote copy of the disk image as a network drive. A client computing device, for instance, may map a disk image remotely stored on a server computing device as a network drive, and the utility program may then install the disk image to the storage device of the client computing device from this remote copy. This solution is problematic, too, however. Network drive mapping occurs at a relatively high layer protocol, such as an application-layer network protocol like the Server Messaging Block (SMB) and Common Internet File System (CIFS) protocols.

However, to use such network drive mapping, optional components may have to be installed and/or configured within the preinstallation environments to support the protocols in question, adding extra steps to the drive image installation process. Even if such optional components do not have to be installed, utilizing an application-layer network protocol adds complexity and administrative overhead to the drive image installation process. Application-layer network protocols generally have to be supported by existing network services, such as by being enabled in firewalls, which also means that using network drive mapping renders the system as a whole more susceptible to security vulnerabilities, because a "hole" in the network is opened.

The techniques disclosed herein for installing a disk image onto a computing device overcome these and other problems. A preinstallation environment can use a transport protocol, like the Hypertext Transport Protocol (HTTP), to randomly access a disk image stored on a server computing device in a file-based disk image format, over a network. The disk image can be remotely mounted at the computing device from the server computing device, and installed on the computing device's storage device, without having to (first) download the disk image locally, and without having to map the disk image as a network drive using an application-layer network protocol.

The storage device can thus have a maximum storage space less than the sum of the size of the disk image as stored in the file-based disk image format, and the size of the disk image in an uncompressed format resulting from decompression and installation of the disk image. In other words, the storage device does not have to be sized larger just for disk image installation purposes. The transport protocol that is employed is at a lower layer than an application-layer network protocol, and most preinstallation environments have standard preinstalled filesystem drivers to communication using such protocols without optional networking components that are not built into the preinstallation environment having to be installed. As such, less overhead and complexity results.

Because the computing device's remote access of the disk image stored on the server computing device is random—i.e., and not just sequential—feature-rich utility programs like setup programs and the ImageX command line tool can be used in conjunction with the disclosed techniques to install the disk image. Stated another way, specially built, custom utility programs do not have to be constructed. The preinstallation environments in relation to which the disclosed techniques can be used include Windows PE, which itself may be part of enterprise-oriented tools, like the Hewlett Packard Client Automation (HPCA) environment, available from Hewlett-Packard Company, of Palo Alto, Calif.

FIG. 1 shows an example system 100 in which a server-stored disk image can be installed on a client. The example system 100 includes a client computing device 102 and a server computing device 104 that are communicatively interconnected with one another over a network 106. The client computing device 102 may be a desktop or a laptop computer, and may be what is referred to as a thin client computing device, which typically has a smaller capacity storage device and other resources that are limited in capacity and/or performance. The server computing device 104 may also be a computer. Furthermore, the client computing device 102 may also be a server computing device, different than the server computing device 104, but which for the purposes of the example system 100 is a client to the server 104. The network 106 may be or include one or more of the Internet, an intranet, an extranet, a local-area network (LAN), a wide-area network (WAN), a wired network, a wireless network, and so on.

A disk image 108 is stored on the server computing device 104 in a file-based disk image format. As such, the disk image 108 can be stored in a compressed format, such as the WIM. The disk image 108 may include an operating system and one or more computer programs that are to run in conjunction with the operating system. The disk image 108 may have been prepared in advance by a user to deploy on a number of client computing devices of the same type, and including the client computing device 102. It is noted that the WIM is a compression file format optimized for storing operating systems in general, and versions of the Microsoft Windows® operating system in particular.

The client computing device 102 has a preinstallation environment 110 running thereon. The preinstallation environment 110 may be the Windows PE, and may be a part of the HPCA environment that provides for automation of tasks to be performed at the client computing device 102. The preinstallation environment 110 may be a minimal operating system designed to permit minimal functionality to be performed on the client computing device 102, such as to install a fuller-featured operating system, like that within the disk image 108.

The preinstallation environment 110 can include a transport protocol layer 112 and a filesystem driver 113. Both the transport protocol layer 112 and the filesystem driver 113 may be built into the preinstallation environment 110, without optional networking or other components that are not standard within the environment 110 having to be installed. That is, the base functionality of the preinstallation environment 110 can include the filesystem driver 113 and the transport protocol layer 112, such that the driver 113 and the layer 112 do not have to be specified by a user when the environment 110 is installed on the client computing device 102.

The transport protocol layer 112 is a network protocol layer that is a lower layer than an application-layer network protocol like SMB and CIFS. An example of the transport protocol layer 112 is HTTP. The transport protocol layer 112 provides for the transmission of network packets across the network 106, such as to and from the server computing device 104. However, the transport protocol layer 112 is not an application protocol layer. For instance, applications such as SMB and CIFS may and typically do employ the transport protocol layer 112, but are implemented by the transport protocol layer 112 itself.

The filesystem driver 113 can be a preinstalled standard filesystem driver, which employs the transport protocol layer 112, and in some implementations not any higher layers. Specifically, the filesystem driver 113 permits the disk image 108 stored on the server computing device 104 to be remotely mounted as the mounted disk image 114, without having to download or copy the disk image locally to the client computing device 102. That is, the mounted disk image 114 is a remote or virtual disk image, in that the actual disk image 108 resides and is stored on the server computing device 104. Furthermore, the filesystem driver 113 provides for this functionality without mapping the disk image 108 as a network drive within the preinstallation environment 110 using an application-layer network protocol like and/or used by protocols such as SMB and CIFS.

By remotely mounting the disk image 108 stored on the server computing device 104 as the mounted disk image 114 at the client computing device 102, through the filesystem driver 113 and the transport protocol layer 112, random access of the disk image 108 (via the mounted disk image 114) can be achieved within the preinstallation environment 110. Random access means that different parts of the disk image 108 can be retrieved at different times, out of order. By comparison, sequential access, as is achieved in disk streaming, means that the disk image 108 is transmitted from beginning to end in order, and cannot be accessed out of order, randomly.

The preinstallation environment 110 includes a utility program 118, which may be a setup program or the ImageX command line tool, or even more generally, an extraction or decompression program. The utility program 118 installs the disk image 108 onto the client computing device 102, as the installed disk image 120, via random access and retrieval of the disk image 108 through its remotely mounted version (i.e., the mounted disk image 114). From the perspective of the utility program 118, the mounted disk image 114 appears to be located at the client computing device 102, even though the mounted disk image 114 is in actuality a virtual version of the disk image 108 physically stored on the server computing device 104.

The file-based disk image format of the disk image 108 thus permits installation of the disk image 108 onto the client computing device 102, as the installed disk image 120, using the utility program 118. Stated another way, the utility program 118 is able to install the disk image 108, via the virtual version thereof (i.e., the mounted disk image 114), onto the client computing device 102, as the installed disk image 120. The utility program 118 may have to randomly access the disk image 108, and cannot just employ direct streaming of the disk image 108.

Figure 2:
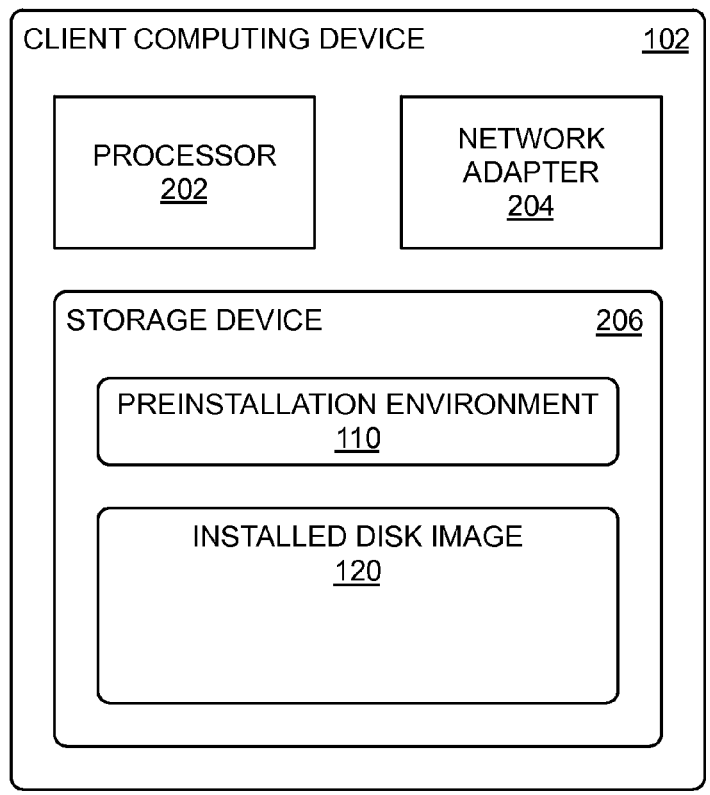
FIG. 2 is a diagram of an example hardware implementation of a client.

FIG. 2 shows an example hardware implementation of the client computing device 102. The client computing device 102 can be implemented as a desktop or a laptop computer, for instance. The client computing device 102 includes at least a processor 202, a network adapter 204, and a storage device 206. The client computing device 102 typically includes other hardware components as well, in addition to and/or in lieu of the processor 202, the network adapter 204, and the storage device 206.

The network adapter 204 permits the client computing device 102 to communicate over the network 106 of FIG. 1. The storage device 206 can be or include a non-volatile storage device and/or a volatile storage device. Examples of the latter include dynamic random access semiconductor memory. Examples of the former include hard disk drives, flash memory, and SSDs.

The storage device 206 stores the preinstallation environment 110, as well as ultimately the installed disk image 120. As depicted by the relative sizes of the preinstallation environment 110 and the installed disk image 120 in FIG. 2, usually the environment 110 occupies less space than the disk image 120. The processor 202 is said to execute, and thus implement, the preinstallation environment 110 and the installed disk image 120, including the utility program 118, the filesystem driver 113, and the transport protocol layer 112 of FIG. 1.

As depicted in FIG. 2, the storage device 206 has a size to store basically just the preinstallation environment 110 and the installed disk image 120. The capacity of the storage device 206 can be insufficient to also store the disk image 108 of FIG. 1 prior to decompression and installation thereof as the installed disk image 120. As such, remote mounting of the disk image 108 as the remotely mounted disk image 114 of FIG. 1 permits the installation of the installed disk image 120 without having to increase the capacity of the storage device 206 just for this purpose.

Figure 3:
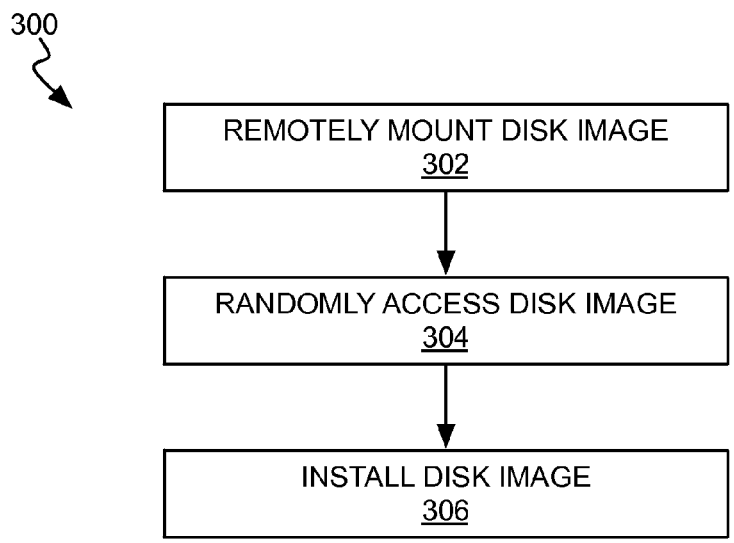
FIG. 3 is a flowchart of an example method.

FIG. 3 shows an example method 300 for installing a server-stored disk image on a client, consistent with the foregoing description. The method 300 may be implemented as a computer program that is executable by a processor of a client computing device. The computer program may be stored on a non-transitory computer-readable data storage medium.

A disk image stored on a server computing device is remotely mounted from the server computing device at the client computing device (302). As such, the client computing device can remotely access the disk image stored on the server computing device, over a network (304). Ultimately, the disk image is installed on a storage device of the client computing device (306). Such installation is performed without having to map the disk image as a network drive at the client computing device using an application-layer network protocol, and without having to first download the disk image locally to the client computing device, as has been described above. Such installation can involve executing a utility program within a preinstallation environment at the client computing device, as has also been described above.

I claim:

1. A client computing device comprising:
   a processor;
   a storage device; and,
   a preinstallation environment executable by the processor to randomly access via a transport protocol over a network a disk image stored on a server computing device in a file-based disk image format, to remotely mount the disk image from the server computing device, and to install the disk image on the storage device, without having to download the disk image locally and without mapping the disk image as a network drive using an application-layer network protocol,
   wherein the storage device has a maximum storage space less than a sum of a size of the disk image in the file-based disk image format and a size of the disk image in an uncompressed format resulting from decompression of the disk image in the file-based disk image format.

2. The client computing device of claim 1, wherein the transport protocol is a network protocol at a lower layer than the application-layer network protocol.

3. The client computing device of claim 1, wherein the file-based disk image format is adapted to permit installation of the disk image using a utility program that has to randomly access the disk image and that cannot just employ direct streaming of the disk image without random access of the disk image,
   and wherein the client computing device further comprises the utility program executable within the preinstallation environment to install the disk image on the storage device subsequent to the disk image having been remotely mounted.

4. The client computing device of claim 3, wherein the utility program is one of:
   a Microsoft ImageX command line tool;
   a setup program;
   an extraction program.

5. The client computing device of claim 1, wherein the preinstallation environment is to remotely mount the disk image by using a preinstalled standard filesystem driver that is built into the preinstallation environment, without having to install optional networking components that are not built into the preinstallation environment.

6. The client computing device of claim 5, wherein the optional networking components comprise one or more of:
   a Server Message Block (SMB) application-layer network protocol;
   a Common Internet File System (CIFS) application-layer network protocol.

7. The client computing device of claim 1, wherein the preinstallation environment is a Microsoft Windows Preinstallation Environment (Windows PE).

8. The client computing device of claim 7, wherein the preinstallation environment is part of a Hewlett Packard Client Automation (HPCA) environment.

9. The client computing device of claim 1, wherein the file-based disk image format is a Microsoft Windows Imaging Format (WIM).

10. The client computing device of claim 1, wherein the transport protocol is a Hypertext Transport Protocol (HTTP).

11. A method comprising:
    randomly accessing over a network a disk image stored on a server computing device, by a client computing device using a transport protocol, the disk image being in a file-based disk image format;
    remotely mounting the disk image from the server computing device, at the client computing device; and,
    installing the disk image on a storage device of the client computing device, without having to download the disk image locally to the client computing device,
    wherein the storage device has a maximum storage space less than a sum of a size of the disk image in the file-based disk image format and a size of the disk image in an uncompressed format resulting from decompression of the disk image in the file-based disk image format.

12. The method of claim 11, wherein installing the disk image on the storage device of the client computing device is performed without having to map the disk image as a network drive at the client computing device using an application-layer network protocol.

13. The method of claim 11, wherein the transport protocol is a network protocol at a lower layer than an application-layer network protocol.

14. The method of claim 11, wherein installing the disk image on the storage device of the client computing device comprises executing a utility program at the client computing device, the utility program having to randomly access the disk image to install the disk image on the storage device and cannot just employ direct stream of the disk image without random access of the disk image.

15. A non-transitory computer-readable data storage medium storing a computer program executable by a client computing device to perform a method comprising:
   randomly accessing over a network a disk image stored on a server computing device, by a client computing device using a transport protocol, the disk image being in a file-based disk image format;
   remotely mounting the disk image from the server computing device, at the client computing device; and,
   installing the disk image on a storage device of the client computing device, without having to map the disk image as a network drive at the client computing device,
   wherein the storage device has a maximum storage space less than a sum of a size of the disk image in the file-based disk image format and a size of the disk image in an uncompressed format resulting from decompression of the disk image in the file-based disk image format.

16. The non-transitory computer-readable data storage medium of claim 15, wherein installing the disk image on the storage device of the client computing device is performed without having to first download the disk image locally to the client computing device.

17. The non-transitory computer-readable data storage medium of claim 15, wherein the transport protocol is a network protocol at a lower layer than an application-layer network protocol.

18. The non-transitory computer-readable data storage medium of claim 15, wherein installing the disk image on the storage device of the client computing device comprises executing a utility program at the client computing device, the utility program having to randomly access the disk image to install the disk image on the storage device and cannot just employ direct stream of the disk image without random access of the disk image.

* * * * *